United States Patent [19]
Albicker et al.

[11] Patent Number: 5,953,892
[45] Date of Patent: Sep. 21, 1999

[54] LOADING DEVICE FOR AGRICULTURAL HARVESTERS

[75] Inventors: Kurt Albicker, Enniger; Karl-Heinz Landwehr, Hagen, both of Germany

[73] Assignee: CLAAS KGaA, Harsewinkel, Germany

[21] Appl. No.: 08/936,376

[22] Filed: Sep. 24, 1997

[30] Foreign Application Priority Data

Sep. 25, 1996 [DE] Germany ............................ 196 41 211

[51] Int. Cl.⁶ .................................................. A01D 41/00
[52] U.S. Cl. .................................. 56/71; 406/193; 414/42
[58] Field of Search ...................................... 56/13.3, 13.6,
56/16.6, 71, 13.9; 15/328, 338, 418; 209/135,
137, 458, 485; 285/179.1, 179.2; 406/193

[56] References Cited

U.S. PATENT DOCUMENTS

| | | | |
|---|---|---|---|
| 614,295 | 11/1898 | Dick | 285/179.2 |
| 786,991 | 4/1905 | Podlesak | 285/179.2 |
| 2,496,472 | 2/1950 | Huddle | 414/42 |
| 2,778,510 | 1/1957 | Mayhill et al. | 414/42 |
| 3,110,521 | 11/1963 | Rogers et al. | 302/64 |
| 3,556,327 | 1/1971 | Garrison | 414/522 |
| 4,130,300 | 12/1978 | Sheridan | 285/179.2 |
| 4,595,319 | 6/1986 | Cook | 406/193 |

*Primary Examiner*—Robert E. Pezzuto
*Attorney, Agent, or Firm*—Michael J. Striker

[57] ABSTRACT

A loading device for agricultural harvesters has a lower discharge chute arrangeable on a harvester and an upper discharge chute provided with an adjustable ejection flap and rotatably supported on the lower discharge chute. The upper discharge chute has an impact region provided with a cover-free portion which is closeable by an exchangeable baffle plate. The upper discharge chute can have an adjustable length and is composed of individual segments which are connectable with one another by connecting flanges to provide a desired efficient transporting length.

13 Claims, 3 Drawing Sheets

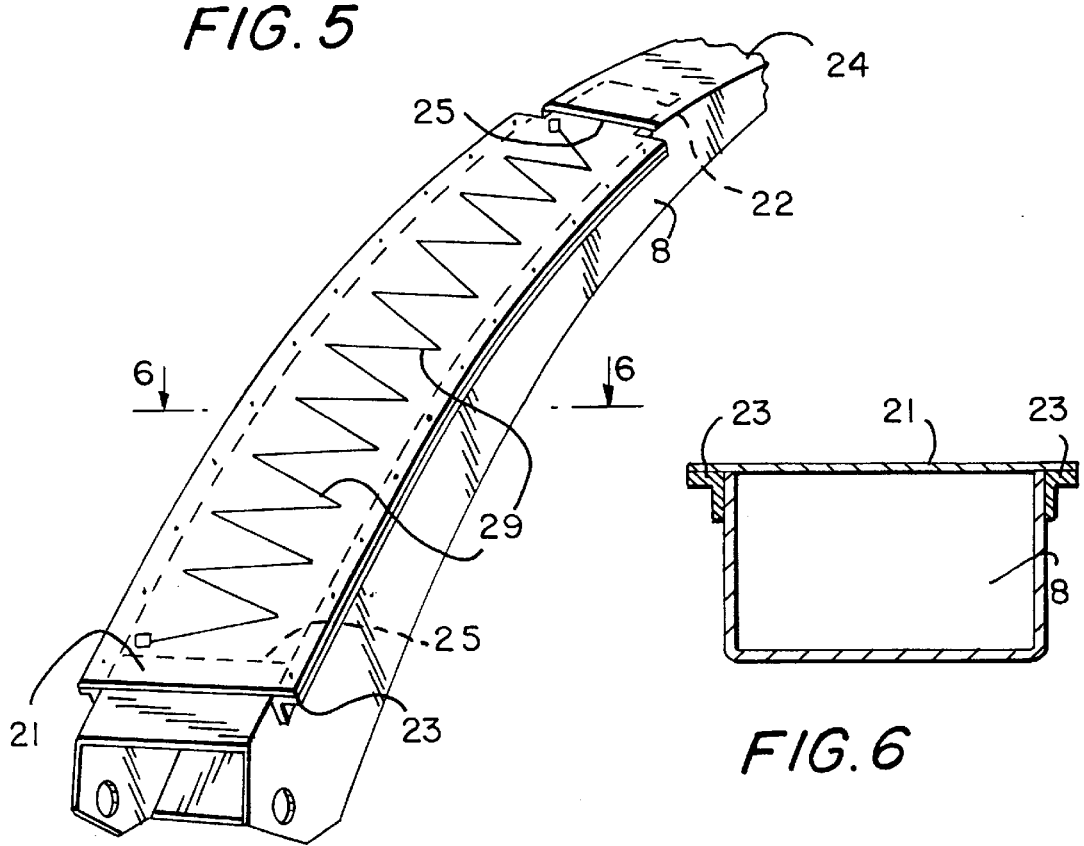

ial content of the plant juices released in the chopping and
LOADING DEVICE FOR AGRICULTURAL HARVESTERS

BACKGROUND OF THE INVENTION

The present invention relates to a loading device for agricultural harvesters, in particular for a self-propelling field chopper.

Loading devices of harvesters are used for transferring of products harvested with an agricultural machine, such as for example green product, fodder grain, leguminous and other stalk fruits, to a transporting vehicle which supplies the harvested product, in some cases also processed, to its further predetermined use. Such loading devices are known in various embodiments and have a generally common principal construction. The loading device usually has a lower discharge chute in which in many applications a post-accelerator for the product discharge is arranged, and a freely standing upper discharge chute which is formed of one piece and closable by an adjustable ejection flap. The upper discharge chute is flanged on the lower discharge chute of the harvester rotatably through a rotary rim about a vertical axis. In the region of the connecting point it is articulatingly connected so as to be vertically adjustable about its rotary point. In this way the product stream can be deviated and dispersed so that the available transportation volume of the transportation vehicle is used as fully as possible and a loss-free product transfer is guaranteed. The ejection flap mounted on the end of the upper discharge chute serves the same purpose. Its working positions are adjustable by means of a hydraulic adjusting device.

The principal construction and operation of these loading devices have been proven efficient in practice during loading of transporting vehicles which are available through a not closed, upwardly open loading space.

For transportation of the harvested, chopped and in some cases conditioned products from the cultivating area, also transporting vehicles with a closed loading space are used, wherein the product stream is supplied through a loading opening in the transporting space. For the product transfer, the transporting vehicle must move laterally as close as possible to the harvester. The loading of the transporting vehicle through a side opening is not without problems in this case because of the relatively long upper discharge chute of the loading device. The loss-free product transfer from the harvester to the transporting vehicle requires a substantially high driver's skills and improved control by the operator of the harvester, to provide a substantially loss-free product transfer during deviations of the upper discharge chute due to ground unevenness.

It is further known during harvesting of green products, leguminous plants and stalk fruits that ground material, such as sand adhering to the harvested product is taken and supplied by the attachment into the harvester. When the harvested product is preprocessed and prepared in the chopping and conditioning device and discharged through the post-accelerator, the ground particles which are contained in the processed harvested product positively transfer a high kinetic energy. Therefore, the friction forces apply high loads to the upper discharge chute, namely in the impact region, which leads to a premature wear of the upper discharge chute. This wear process is advanced by the acid content of the plant juices released in the chopping and conditioning process.

In order to increase the service life of the upper discharge chute and minimize required maintenance work and service rates, the upper discharge chute is provided with exchangeable wear plates in the impact region and on the side walls. With increasing wear of these plates, which is determined only during inspection and maintenance works, cracks and wear-caused deformations occur in the plates, in which the discharged harvested product deposits very fast. This leads to clogging during the harvesting process in a relatively short time, so that undisturbed working process is no longer performed and these deficiencies can be eliminated only by expensive manual work.

SUMMARY OF THE INVENTION

Accordingly, it is an object of present invention to provide a loading device for a harvester, which avoids the disadvantages of the prior art.

More particularly, it is an object of present invention to provide a loading device for a harvester, which eliminates the wear-causing clogging and, without substantial manual expenses, provides an adaptation of the loading device to the loading conditions of the transporting vehicle for a product transfer.

In keeping with these objects and with others which will become apparent hereinafter, one feature of present invention resides, briefly stated in a loading device in which the upper discharge chute in its impact region has a cover-free portion which is closeable by an exchangeable baffle plate.

When the loading device is designed in accordance with present invention, it eliminates the disadvantages of the prior art. With relatively simple means, the present invention leads to a further increase of a loss-free harvesting and simultaneously provides a continuous disturbance-free harvesting process with a further reduction of the required service rate and maintenance work for the harvester.

When the loading device is designed in accordance with the present invention, then in the impact region which is especially aggressively loaded by a harvested product stream having a relatively high discharge energy and which is subjected to a high wear, a cover-free portion is covered with a baffle plate so that the harvested product stream can be discharged without obstacles and with low friction losses from the harvester into a transporting vehicle.

In accordance with a further feature of the present invention, the upper discharge chute can have an adjustable length and be composed of individual sections which are connectable with one another to provide a desired, efficient transporting length by a connecting flange. The baffle plate which closes the cover-free portion with respect to a flow direction of the harvested product stream step-free, is mounted exchangeably on holding angles which are provided on the upper discharge chute. In this construction the baffle plate which is mounted on the holding angles of the upper discharge chute rests with an end portion on the cover of the upper discharge chute and is provided at the opposite end side with a tongue which is plugged under the covering of the upper discharge chute.

This arrangement guarantees that in the transporting direction of the harvested product stream no steps or projections are provided, on which the harvested product can accumulate and cause clogging and operational disturbances. For required inspection and maintenance works, the baffle plate can be removed in a simple manner and exchanged fast when needed.

In accordance with a further feature of the present invention, the inner surface of the baffle plate is treated in order to increase a wear resistance.

In accordance with still a further feature of the present invention, the inner side of the baffle plate is provided with sensors, with which the operational condition of the upper discharge chute and the operational process during the product discharge can be monitored and controlled from a driver's stand of the harvester.

The upper discharge chute can be subdivided into several sections which are connected with one another by connecting flanges. In this construction it is possible to adjust the efficient length of the upper discharge chute to the customer wishes and to the transportation equipment which is used for transportation of the harvested product from the cultivated area. The connecting flanges of individual upper discharge chute segments are preferably provided with coupling elements which, during connection of the individual segments to provide the desired transportation length, produce automatically an operationally-efficient coupling of the supply conductors for the adjusting device of the ejection flap and for the illumination device located on the ejection flap. The supply conductors are preferably guided in stabilization tubes which are arranged on the outer surface of the upper discharge chute segments.

The inventive construction of the upper discharge chute provides for a fast and simple adaptation of the efficient transporting length to the corresponding loading conditions immediately before the site. Moreover, the handling of the individual tube segments relative to the previously one-piece upper discharge chute in the manufacture is easier and simpler. The substantially lower space consumption is needed for the manufacture of the individual segments and their preparedness for the mounting, so that the manufacturing and mounting costs are favorably influenced.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 5 is a view showing a construction of the inventive upper discharge chute in an impact region; and FIG. 6 is a view showing a section taken along the line VI—VI in FIG. 5.

DESCRIPTION OF PREFERRED EMBODIMENTS

Figure 1:
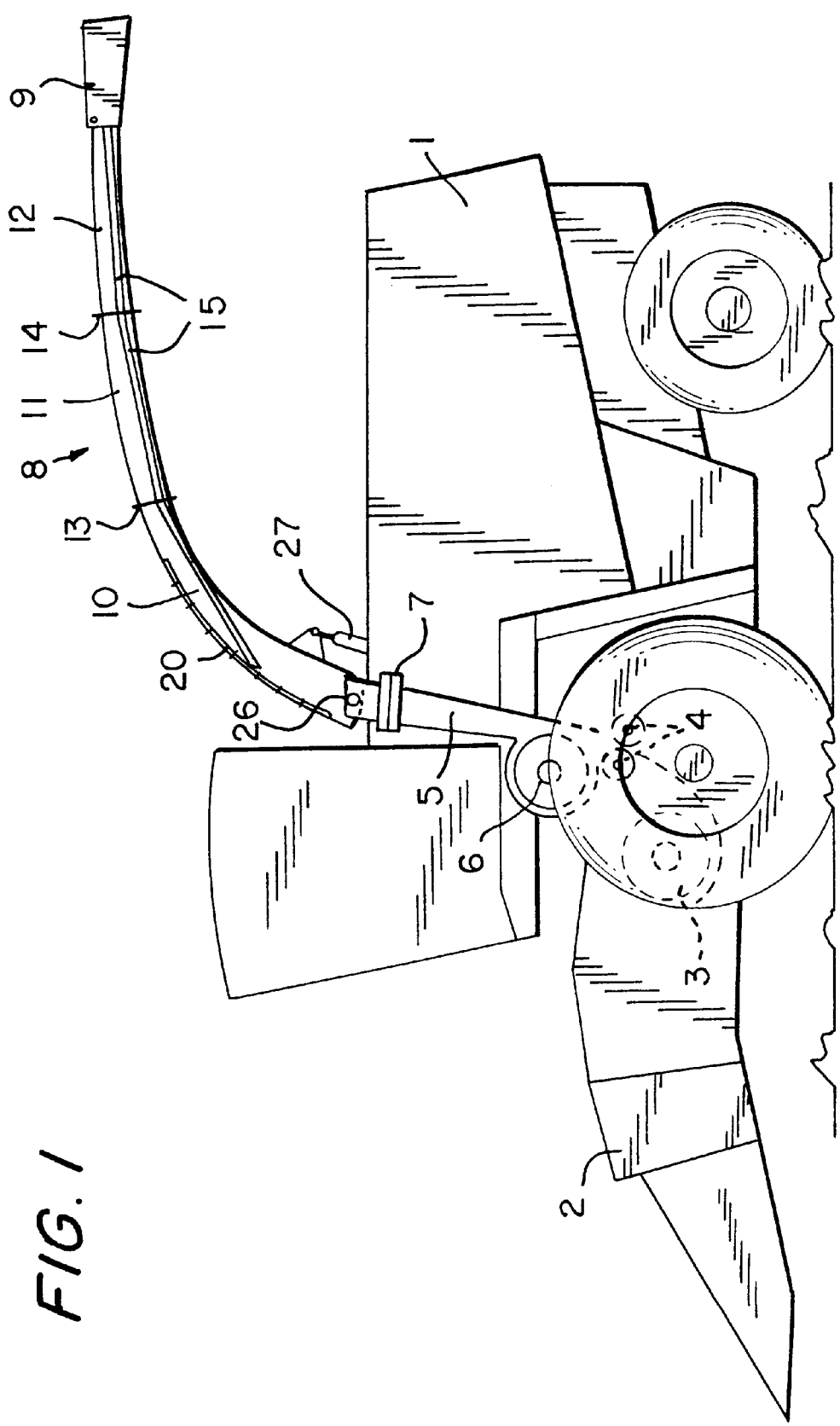
FIG. 1 is a side view schematically showing a field chopper in accordance with the present invention.
Figure 2:
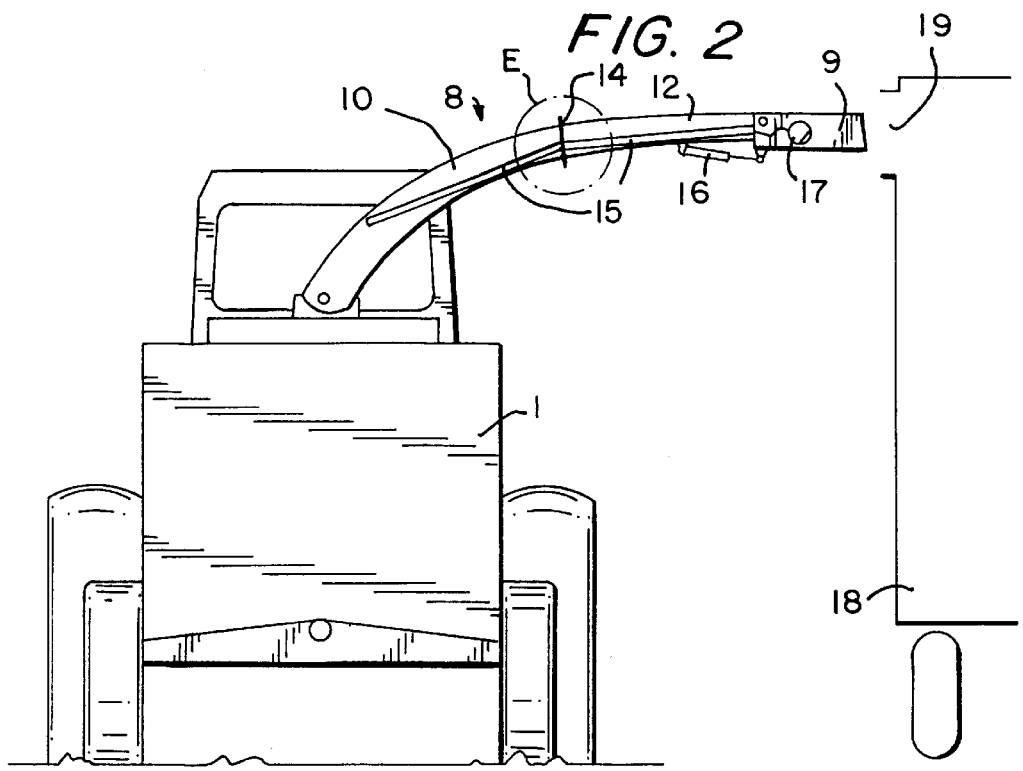
FIG. 2 is a view schematically showing a field chopper with an upper discharge chute adjusted for a product transfer.
Figure 3:
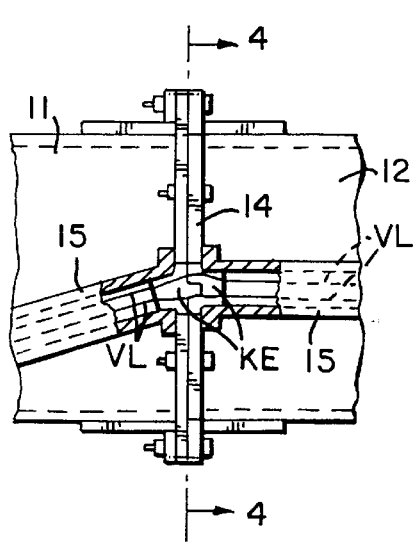
FIG. 3 is a view showing a detail identified with reference E in FIG. 2.
Figure 4:
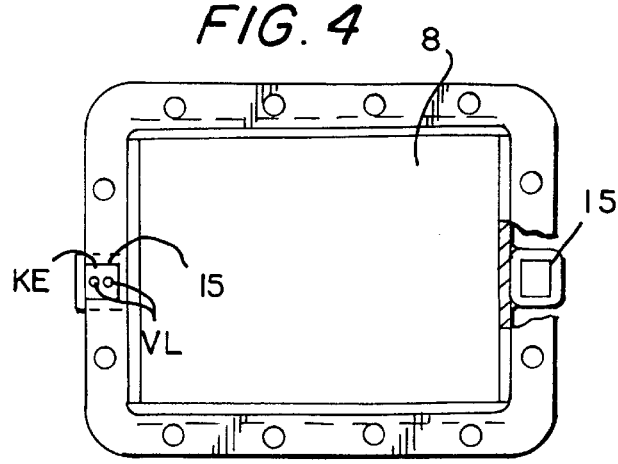
FIG. 4 is view showing a section taken along the line IV—IV in FIG. 3.

A harvested product which is cut on an agricultural used area with a harvesting attachment 2 of a self-propelling field chopper 1 is supplied after comminuting to a chopper device 3. After a further processing in a conditioner device 4 it is supplied to a lower discharge chute 5. In the lower discharge chute the transporting energy transmitted to the harvested product in preceding processing and treatment stages 3 and 4 is further increased for a product discharge from the field chopper 1 by means of a post-accelerator 6. The harvested product loaded with increased transportation energy is supplied in a free-standing upper discharge chute 8 and is discharged through the upper discharge chute 8 on a transportation vehicle 18.

The upper discharge chute 8 is turnably articulated on the lower discharge chute 5 of the field chopper 1 with the use of a rotary rim 7. It can be turned by means of an adjusting device 27 about a rotary point 26 for changing the ejection height in the interest of a complete utilization of the available transporting volume. The upper discharge chute 8 is closed with an ejection flap 9 which is controllable by an adjusting device 16 for additionally controlling and guiding the harvested product stream during the product transfer to the transporting vehicle 18.

In accordance with the present invention, the upper discharge chute 8 is composed of individual segments 10, 11, 12 which are screwed with one another by connecting flanges 13 and 14. In this manner, the efficient transporting length of the upper discharge chute 8 can be varied in any manner in correspondence with the respective requirements for the product discharge. Simultaneously, it is guaranteed that also the transporting vehicle 18 which has a closed loading space and is available through a loading opening 19, can ride as close as possible to the field chopper 1 to provide a loss-free product discharge. The operator of the field chopper is also relieved with respect to the required control and monitoring of the product transfer process.

The connecting flanges 14 and 15 are provided preferably with coupling elements KE. The coupling elements automatically connect with one another the supply conductors VL guided in the stabilization tubes 15 for the adjusting device 16 and for the illumination device 17 on the ejection flap 9, during assembly of the individual segments 10, 11, 12.

As can be seen from FIGS. 1, 5 and 6, an impact region 20 of the upper discharge chute 8 has a cover-free portion 25 which is closed by an exchangeable baffle plate 21. The baffle plate 21 has an end portion 28 abutting against a remaining cover 24 of the upper discharge chute 8. At the opposite side, it has a tongue 22 which is plugged under the cover 24 in the upper discharge chute 8. The baffle plate 21 is mounted by screws on holding angles 23 provided on the outer casing of the upper discharge chute or the segments 10, 11, 12. The construction and arrangement of the baffle plate 21 guarantees that, when considered in a flying direction of the product stream to be discharged, no steps and projections are available on which the harvested product can deposit and thereby cause clogging.

The inner side of the baffle plate 21 can be provided a wear-resistant surface structure. Preferably, the inner side of the baffle plate 21 is provided with sensors 29. The sensors perform an online monitoring of the operational conditions and operational process in the loading device or upper discharge chute 8.

It will be understood that each of the elements described above, or two or more together, may also find a useful application in other types of constructions differing from the types described above.

While the invention has been illustrated and described as embodied in loading device for agricultural harvester threshers, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A loading device for agricultural harvesters, comprising a stationary lower discharge chute; and a freely-standing height-adjustable upper discharge chute which is rotatably connected with said lower discharge chute and provided with an adjustable ejection flap, said upper discharge chute having an impact region with a cover-free portion; and a releasably connected wear-resistant exchangeable baffle plate mounted to an exterior of said cover-free portion, which simultaneously closes said cover-free portion, increases service life of said upper discharge chute and further includes releasably connecting means for connecting with said upper discloses chute; and releasably connecting means releasably connecting said wear-resistant exchangeable buffle plate to the exterior of said cover-free portion.

2. A loading device as defined in claim 1; and further comprising a post-accelerator arranged in said lower discharge chute for a discharge of a harvested product.

3. A loading device as defined in claim 1; and further comprising a rotary rim which rotatably connects said upper discharge chute with said lower discharge chute.

4. A loading device as defined in claim 1, wherein said upper discharge chute is provided with holding angles, said baffle plate closing said cover-free portion in a step-free manner relative to a flying direction of a harvested product stream and being exchangeably mounted on said holding angles.

5. A loading device as defined in claim 1, wherein said upper discharge chute has a cover, said baffle plate having an end portion abutting against said cover of said upper discharge chute and an opposite-side tongue engaging under said cover.

6. A loading device as defined in claim 1, wherein said baffle plate has an inner side having a high wear-resistant surface.

7. A loading device as defined in claim 1, wherein said upper discharge chute has an adjustable length and is composed of individual segments; and further comprising connecting flanges which connect said individual segments with one another to provide a desired effective transportation length.

8. A loading device for agricultural harvesters, comprising a stationary lower discharge chute; and a freely-standing height-adjustable upper discharge chute which is rotatably connected with said lower discharge chute and provided with an adjustable ejection flap, said upper discharge chute having an impact region with a cover-free portion which is closed by an exchangeable baffle plate, said upper discharge chute having an adjustable length and is being composed of individual segments; connecting flanges which connect said individual segments with one another to provide a desired effective transportation length, said ejection flap being provided with an adjusting device and a lamp; supply conductors provided for said adjusting device and said lamp; and stabilizing tubes which guide said supply conductors.

9. A loading device as defined in claim 8, wherein said connecting flanges are provided with coupling elements which automatically provide a throughgoing connection of said supply conductors.

10. A loading device for agricultural harvesters, comprising a stationary lower discharge chute arrangeable on a harvester; and a free-standing height-adjustable upper discharge chute provided with an adjustable ejection flap and turnably mounted in said lower discharge chute, said upper discharge chute having an adjustable length and being composed of individual segments which are connected with one another to provide a desired efficient transporting length; connecting flanges which connect with one another said individual segments, said ejection flap being provided with an adjusting device and a lamp; supply conductors provided for said adjusting device and said lamp; and stabilizing tubes which guide said supply conductors.

11. A loading device as defined in claim 10, wherein said connecting flanges are provided with coupling elements which automatically provide a throughgoing connection of said supply conductors.

12. A loading device for agricultural harvesters, comprising a stationary lower discharge chute; and a freely-standing height-adjustable upper discharge chute which is rotatably connected with said lower discharge chute and provided with an adjustable ejection flap, said upper discharge chute having an impact region with a cover-free portion which is closed by an exchangeable baffle plate, said baffle plate having an inner side provided with sensors and with signal conductors guided in stabilizing tubes.

13. A loading device for agricultural harvesters, comprising a stationary lower discharge chute arrangeable on a harvester; and a free-standing height-adjustable upper discharge chute provided with an adjustable ejection flap and turnably mounted in said lower discharge chute, said upper discharge chute having an adjustable length and being composed of individual segments which are connected with one another to provide a desired efficient transporting length, said upper discharge chute having an impact region with a cover-free portion closeable by an exchangeable buffle plate, said baffle plate having an inner side provided with sensors with signal conductors guided in stabilizing tubes.

* * * * *